United States Patent
Ge et al.

(10) Patent No.: US 9,516,612 B2
(45) Date of Patent: Dec. 6, 2016

(54) DYNAMIC POWER MANAGEMENT SCHEME IN WIRELESS NETWORKS BASED ON POWER OVER ETHERNET (POE)

(71) Applicant: QUALCOMM Incorporated, San Diego, CA (US)

(72) Inventors: Feng Ge, Highland Park, NJ (US); Vincent Douglas Park, Budd Lake, NJ (US); Junyi Li, Chester, NJ (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 15/084,131

(22) Filed: Mar. 29, 2016

(65) Prior Publication Data

US 2016/0212717 A1 Jul. 21, 2016

Related U.S. Application Data

(62) Division of application No. 13/917,515, filed on Jun. 13, 2013, now Pat. No. 9,338,750.

(51) Int. Cl.
| | |
|---|---|
| *H04W 52/04* | (2009.01) |
| *H04W 52/02* | (2009.01) |
| *H04L 12/10* | (2006.01) |
| *H04W 8/00* | (2009.01) |
| *H04W 52/54* | (2009.01) |

(52) U.S. Cl.
CPC .............. *H04W 52/54* (2013.01); *H04L 12/10* (2013.01); *H04W 8/005* (2013.01); *H04W 52/0206* (2013.01); *H04W 52/04* (2013.01); *Y02B 60/50* (2013.01)

(58) Field of Classification Search
CPC ...... H04W 4/008; H04W 8/005; H04W 84/18; H04W 64/00; H04B 17/318; H04M 2250/002
See application file for complete search history.

(56) References Cited

U.S. PATENT DOCUMENTS

| | | | |
|---|---|---|---|
| 7,039,404 B2 | 5/2006 | Das et al. | |
| 7,106,703 B1* | 9/2006 | Belcea | H04W 40/08 370/310 |
| 7,136,645 B2 | 11/2006 | Hanson et al. | |

(Continued)

OTHER PUBLICATIONS

International Search Report and Written Opinion—PCT/US2014/042324—ISA/EPO—Sep. 29, 2014.

*Primary Examiner* — Bobbak Safaipour
(74) *Attorney, Agent, or Firm* — Arent Fox LLP

(57) ABSTRACT

A method, an apparatus, and a computer program product for managing power of a connection point in a wireless communication system are provided. A connection point may discover a mobile node, send to a gateway a request to increase an amount of power that the connection point can consume to service the discovered mobile node, and receive from the gateway a response related to the request to increase the amount of power. In an aspect, a gateway receives from a first connection point a request to change an amount of power that the first connection point is allowed to consume to service a discovered mobile node, determines whether to accept the request from the first connection point, and sends a first command to increase the amount of power that the first connection point is allowed to consume to service the discovered mobile node if the request is accepted.

36 Claims, 10 Drawing Sheets

(56) References Cited

U.S. PATENT DOCUMENTS

| | | | |
|---|---|---|---|
| 8,169,974 B2 | 5/2012 | Pratt et al. | |
| 9,338,750 B2* | 5/2016 | Ge | H04W 52/04 |
| 2005/0136989 A1 | 6/2005 | Dove | |
| 2007/0026866 A1 | 2/2007 | Krishnamurthi et al. | |
| 2010/0211806 A1 | 8/2010 | Diab et al. | |
| 2011/0103260 A1 | 5/2011 | Jeyatharan et al. | |
| 2011/0171989 A1* | 7/2011 | Kim | H04L 5/001 |
| | | | 455/522 |
| 2011/0205969 A1 | 8/2011 | Ahmad et al. | |
| 2012/0108252 A1* | 5/2012 | Dimou | H04W 36/32 |
| | | | 455/450 |
| 2013/0070610 A1* | 3/2013 | Buchholz | H04W 84/10 |
| | | | 370/241 |
| 2014/0334435 A1* | 11/2014 | Al-Shalash | H04W 8/005 |
| | | | 370/330 |

* cited by examiner

DYNAMIC POWER MANAGEMENT SCHEME IN WIRELESS NETWORKS BASED ON POWER OVER ETHERNET (POE)

CROSS-REFERENCE TO RELATED APPLICATION(S)

This application is a divisional of U.S. patent application Ser. No. 13/917,515, entitled "DYNAMIC POWER MANAGEMENT SCHEME IN WIRELESS NETWORKS BASED ON POWER OVER ETHERNET (POE)" and filed on Jun. 13, 2013. The entirety of the disclosure of U.S. patent application Ser. No. 13/917,515 is expressly incorporated by reference herein.

BACKGROUND

1. Field

The present disclosure relates generally to communication systems, and more particularly, to dynamic power management of a wireless network powered by Power over Ethernet (PoE).

2. Background

In some indoor communications systems, it is common for multiple connection points to be powered by a common power source with limited power delivery capabilities due to power source limitations and/or limitations of the wiring delivering the power, e.g., a common DC power source with a DC power bus with limited power delivery capabilities. An Ethernet+Power over Ethernet (PoE) bus is an example of a network communications bus which also serves as a common power supply bus. As some wireless connection points, e.g., base stations, have become relatively inexpensive, it may be desirable to populate a room with a large number of limited range inexpensive connection points to provide a more complete coverage area, increase potential traffic, and/or reduce interference. For example, it may be desirable to connect multiple wireless connection points to an existing Ethernet+PoE bus. Such an approach is particularly attractive for retrofitting conference rooms, halls, etc. which may have an Ethernet+PoE bus already prewired. Unfortunately, a large number of connection points operating at the same time drawing power from the common bus may overload the bus. In some potential system deployments, there may be more connection points in a system than wireless terminals, e.g., mobile nodes, in a particular room at a given point in time. In a communications system wherein the connection points are powered by a common power source via a common power bus with limited power delivery capabilities, there is an upper boundary on the number of connection points which can be operated concurrently due to power constraints on the common power source and/or common power bus.

In view of the above, it should be appreciated that there is a need for new and improved methods of controlling power allocation to connection points, which are powered from a common power source and/or share a common power bus and/or for controlling when one or more power consuming functions are performed by connection points coupled to a common power bus.

SUMMARY

In an aspect of the disclosure, a method, a computer program product, and an apparatus for managing power of a connection point in a wireless communication network are provided. The apparatus discovers a mobile node, sends to a gateway a request to increase an amount of power that the connection point is allowed to consume to service the discovered mobile node, and receives from the gateway a response related to the request to increase the amount of power.

In another aspect, the apparatus receives from a first connection point a request to change an amount of power that the first connection point is allowed to consume in order to service a discovered mobile node, determines whether to accept the request from the first connection point to change the amount of power, and sends a first command to increase the amount of power that the first connection point is allowed to consume to service the discovered mobile node if the request from the first connection point is accepted.

In a further aspect, the apparatus receives from a first connection point servicing a mobile node, information indicating at least one second connection point discovered by the mobile node, determines to change an amount of power that the discovered at least one second connection point is allowed to consume in order to service the mobile node, and sends a command to change the amount of power that the discovered at least one second connection point is allowed to consume.

DETAILED DESCRIPTION

Figure 1:
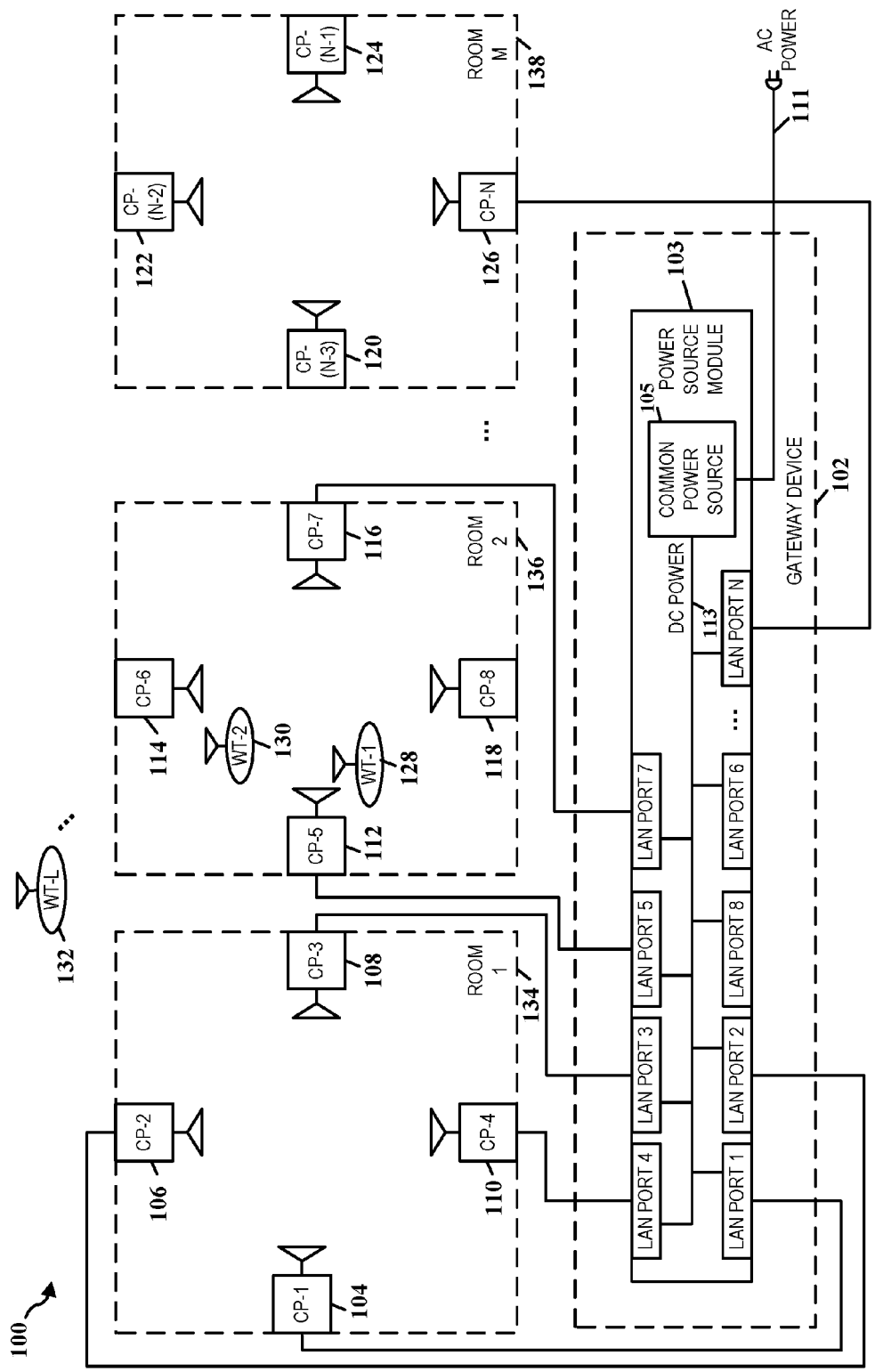
FIG. 1 is a drawing of an exemplary communications system in accordance with various exemplary embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a drawing of an exemplary communications system 100 in accordance with various exemplary embodiments. Exemplary communications system 100 includes a gateway device 102 including a power source module 103 and a plurality of connection points or access points (e.g., connection point 1 (CP-1) 104, CP-2 106, CP-3 108, CP-4 110, CP-5 112, CP-6 114, CP-7 116, CP-8 118, . . . , CP-(N−3) 120, CP-(N−2) 122, CP-(N−1) 124, CP-N 126). A connection point or access point is, for example, an interface at which a mobile node can connect to a network, such as a Wi-Fi access point. The power source module 103 includes a common power source 105 and a plurality of LAN ports (e.g., LAN port 1, LAN port 2, . . . , LAN port N. The common power source 105 receives input AC power via input power lines 111 and outputs generated and filtered DC power via output power lines 113. Output power lines 113 are coupled to designated power lines of the plurality of LAN ports. Gateway device 102 is coupled to each of the CPs via a corresponding LAN port. Within power source module 103, signal lines of a LAN port are coupled to signal lines of other LAN ports and provide a feed through or filtered feed through for Ethernet communications signals. In FIG. 1, LAN port 1 is coupled to CP-1 104, LAN port 2 is coupled to CP-2 106, LAN port 3 is coupled to CP-3 108, LAN port 4 is coupled to CP-4 110, LAN port 5 is coupled to CP-5 112, LAN port 7 is coupled to CP-7 116, and LAN port N is coupled to CP-N 126. Although not shown, LAN port 6 and LAN port 8 are coupled to CP-6 114 and CP-8 118, respectively. Moreover, although not shown, various other LAN ports of the power source module 103 may be coupled to various other corresponding connection points of the communications system 100. For example, although not shown, CP-(N−3) 120, CP-(N−2) 122, and CP-(N−1) 124, are respectively coupled to corresponding LAN ports of the power source module 103. The LAN ports may be coupled to the respective connection points via Ethernet and/or Power over Ethernet (PoE), for example. In exemplary system 100, CP-1 104, CP-2 106, CP-3 108, and CP-4 110 are included within room 1 134 with each CP (104, 106, 108, 110) mounted on a different wall. CP-5 112, CP-6 114, CP-7 116, and CP-8 118 are included within room 2 136 with each CP (112, 114, 116, 118) mounted on a different wall. CP-(N−3) 120, CP-(N−2) 122, CP-(N−1) 124, and CP-N 126 are included within room M 138 with each CP (120, 122, 124, 126) mounted on a different wall.

In some embodiments, the topology is different, e.g., with different size rooms, different numbers of CPs in different rooms, and/or with the locations of the CPs within the rooms being varied throughout the system. Although illustrated with rooms, it should be appreciated that various possible alternatives of the structure are possible, e.g., with each of the CPs coupled to the power source module 103 being located throughout a common open space, or with sets of CPs coupled to power source module 103 being located on different floors or within different non-contiguous portions of a building. In some other embodiments, at least some portions of the coverage area corresponding to CPs coupled to power source module 103 are outdoors. In still other embodiments, the CPs coupled to power source module 103 are within a vehicle, e.g., an airplane, train, ship, or bus. In some embodiments, the power source module 103 is supplied with DC power for input, e.g., with the common power source module 105 performing DC to DC voltage level conversions and filtering.

Exemplary communications system 100 further includes a plurality of wireless terminals (WT-1 128, WT-2 130, . . . , WT-L 132), e.g., mobile nodes, which may move throughout the system 100 and communicate with one or more connection points or access points in its vicinity. In the example of FIG. 1, consider that WT-1 128 and WT-2 130 are currently situated within room 2 and may, and sometimes do, transmit signals, e.g., discovery signals which may be detected by one or more of the CPs (112, 114, 116, 118) within room 2 136, which are being controlled by gateway device 102 to monitor for wireless terminal signals. At different times, the gateway device 102 may, and sometimes does, select and control different CPs to monitor for wireless terminal signals, e.g., in accordance with a predetermined search method and a power distribution budget.

In various embodiments, the predetermined search method includes predetermined time intervals in which a wide area search for WT signals is used, and optional additional time intervals in which a localized search for WT signals is used based on detections in the wide area search.

In some embodiments, a first common power source power budget for allocation of CP monitoring applies to the predetermined wide area search intervals and a second common power source power budget for allocation of CP monitoring applies to the optional conditional localized search intervals, and the first and second power budgets are different. In some embodiments, the different power budgets correspond to different numbers of CPs being selected and controlled to monitor for WT signals during different types of time intervals.

In some embodiments, first and second common power source power budgets correspond to the power budgets for monitoring purposes during particular time intervals, e.g., power for powering on and operating sets of CP receiver modules during the particular time intervals. Other power source power budgets exist, e.g., a power source power budget for operating a set of CPs in a sleep mode of operation in which neither the wireless transmitter or the wireless receive is powered on, and a power source power budget for powering on a set of CP transmitter modules.

Within exemplary system 100, there are a large number of connection points or access points under control of gateway device 102 which are coupled to the power source module 103. The CPs are powered from common power source 105 via power lines. In various embodiments, there are more access points coupled to common power source 105 than can be supported to operate concurrently, e.g., in a particular mode of operation such as a receive mode, based on one or more or all of: the maximum power output capability of common power source 105, the current carrying capabilities of power lines, e.g., wire gage limitations, length of wire runs, and topology of the LAN including the CPs. Gateway 102 selects and controls which access points are to operate at particular points in a timing structure, e.g., selects which subset of access points to monitor to detect signals transmitted from wireless terminals, e.g., discovery signals from wireless terminals, during a particular timing interval.

In an aspect, the present disclosure provides for dynamic power management of a Power over Ethernet (PoE)-powered wireless network. The wireless network comprises a gateway (e.g., gateway device 102 in FIG. 1) and a set of connection points (CPs) (e.g., CP-1 104, CP-2 106, ..., and CP-N 126 in FIG. 1). Mobile nodes (e.g., WT-1 128, WT-2 130, ..., and WT-L 132 in FIG. 1) may be attached to (associated with) the CPs. In a typical embodiment each CP may be powered by PoE, and therefore, may not be plugged into a common wall socket to draw power. Moreover, each CP may have several power modes, e.g., full-operation mode (active mode), idle mode, and power-off mode. In the active mode, the CP may receive data from the gateway via wired Ethernet and transmit the received data to a WT via Wi-Fi or other wireless means. The CP may also receive data from the WT via Wi-Fi or other wireless and transmit the received data to the gateway via wired Ethernet while in the active mode. In the idle mode, the CP may periodically transmit (e.g., broadcast) discovery information to any WT listening and/or periodically enable a wireless receiver to monitor for discovery information transmitted by a WT. In the power-off mode (e.g., sleep mode), a wireless transmitter or wireless receiver of the CP is deactivated.

The gateway may be connected to a CP via an Ethernet cable, for example. The gateway and the CP may negotiate power allocation with each other. For example, the CP may send the gateway a power-request message, which may include a specified power value. In response to the request, the gateway may send to the CP a message (e.g., an echo message) indicating whether the requested power is granted.

In another example, the gateway may send to the CP a power-allocation message including a specified power value. In response, the CP may send a corresponding echo message indicating whether the CP is able to operate according to the allocated power.

When no mobile node is wirelessly attached to (associated with) the CP, or the gateway does not allocate enough power for full operation of the CP, the CP may perform power conservation by implementing an idle mode. While in the idle mode, the CP may periodically wake to monitor for a signal, receive/decode a signal, and identify information in a discovery signal.

As a mobile node travels through the network, the mobile node may discover and/or be discovered by a new CP, disconnect from its previously-attached CP, and attach to (associate with) the new CP. Accordingly, the previously-attached CP may change its power mode from a full-operation mode (active mode) to an idle mode as long as there are no other mobile nodes still attached to the CP. In contrast, the new CP may change its power mode from an idle mode to a full-operation mode (active mode). The present disclosure provides for dynamically coordinating power states of a number of CPs based on mobile node activities. Moreover, the present disclosure provides methods and apparatuses that allow a subset of CPs to be powered at a given time from a common power source to receive and/or send signals. The CPs being powered may be selected to provide adequate wireless signal coverage to user devices in an area being served by CPs coupled to a common bus.

Figure 2:
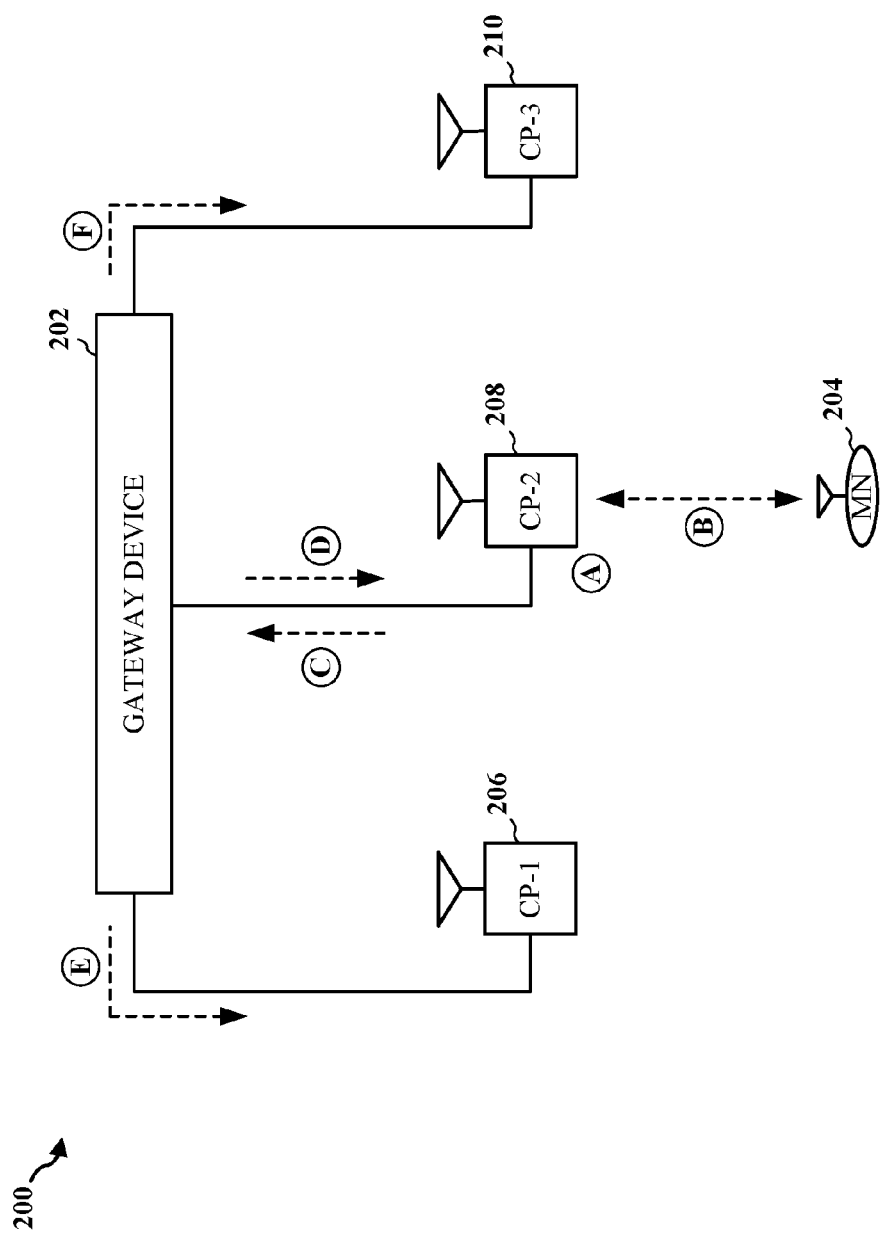
FIG. 2 is a diagram illustrating a power control signaling sequence in an exemplary communications system.

FIG. 2 is a diagram illustrating a power control signaling sequence in an exemplary communications system 200. The communications system 200 includes a gateway device 202, a mobile node (MN) 204, a first connection point (CP-1) 206, a second connection point (CP-2) 208, and a third connection point (CP-3) 210. Although not shown in FIG. 2, the communications system 200 may include other connection points connected to the gateway device 202 and capable of servicing/communicating with the MN 204.

Referring to FIG. 2, at an initial state A, the CP-2 208 may be in an idle mode. At state B, the MN 204 may discover the CP-2 208. Additionally or alternatively, the CP-2 may discover the MN 204 at state B. The discovered MN 204 may not have an established link with the gateway device 202. Based on the presence of the MN 204, the CP-2 208 may determine to change a power mode from the idle mode to a full-operation (active) mode in order to facilitate attachment with, and provide service to, the MN 204. In an aspect, the CP-2 208 provides service to the MN 204 by establishing a link between the MN 204 and the gateway device 202.

At state C, in order to change the power mode, the CP-2 208 may send a power-increase request message to the gateway device 202. The power-increase request message may include a request to increase the amount of power that the CP-2 208 can consume in order to service the MN 204. At state D, the gateway device 202 may accept or deny the power-increase request. The gateway device's decision may depend on a total power budget available to the gateway device 202. For example, the power source module 103 (see FIG. 1) may be capable of providing a particular amount of power to its PoE ports, but the particular amount of power may not be enough to allow all of the CPs to operate in the active mode. Accordingly, the gateway device 202 may monitor which CPs are in which mode so that the total power draw by the CPs is less than or equal to the amount of power that the power source module 103 can provide. Alternatively, the power source module 103 may be able to provide all of the power needed to allow all of the CPs to operate in the active mode simultaneously. Nonetheless, the gateway device 202 may still manage the modes of the CPs to reduce power consumption. Additionally or alternatively, the gateway device's decision may be based on an amount of interference the CP-2 208 consuming the increased amount of power will cause to a neighboring connection point (e.g., CP-1 206 and/or CP-3 210).

If the gateway device 202 accepts the power-increase request from the CP-2 208 at state D, the gateway device 202 may deliver the increased amount of power requested to the CP-2 208 (e.g., via Power over Ethernet (PoE)). The CP-2 208 may then consume the increased amount of power to facilitate attachment with, and begin servicing, the MN 204. The gateway device 202 may further instruct a neighboring connection point, such as the CP-1 206, to change to the idle mode if no mobile node is attached to (associated with) the CP-1 206 (state E). Similarly, the gateway device 202 may instruct the CP-3 210 to change to the idle mode if no mobile node is attached to (associated with) the CP-3 210 (state F).

If the gateway device 202 denies the power-increase request from the CP-2 208 at state D, then the gateway device 202 does not deliver the increased amount of power to the CP-2 208, and the CP-2 208 is not able to facilitate attachment with, nor service, the MN 204 because, for example, the CP-2 208 must remain in idle mode. The gateway device 202 may then coordinate with the CP-1 206 (at state E) to facilitate attachment and service with the MN 204. The gateway device may additionally or alternatively coordinate with the CP-3 210 (at state F) to facilitate attachment and service with the MN 204.

In an aspect, still referring to FIG. 2, multiple connection points (known to be nearby neighbors) may all be activated following the discovery or association of a mobile node with one of the connection points. For example, following the discovery or association of the MN 204 with the CP-2 208, all connection points (e.g., CP-1 206, CP-2 208, and CP-3 210) may be activated (e.g., set into full-operation mode). A power signaling sequence for activating all the connection points may begin with the CP-2 208 sending a power-increase request message to the gateway device 202 (state C) after discovering the MN 204. Thereafter, when the power-increase request is accepted by the gateway device 202, the gateway device 202 may deliver an increased amount of power to the CP-2 208 (state D) as well as the CP-1 206 (state E) and the CP-2 210 (state F). The CP-1 206, the CP-2 208, and the CP-3 210 may then consume the increased amount of power to facilitate attachment with, and service, the MN 204.

Figure 3:
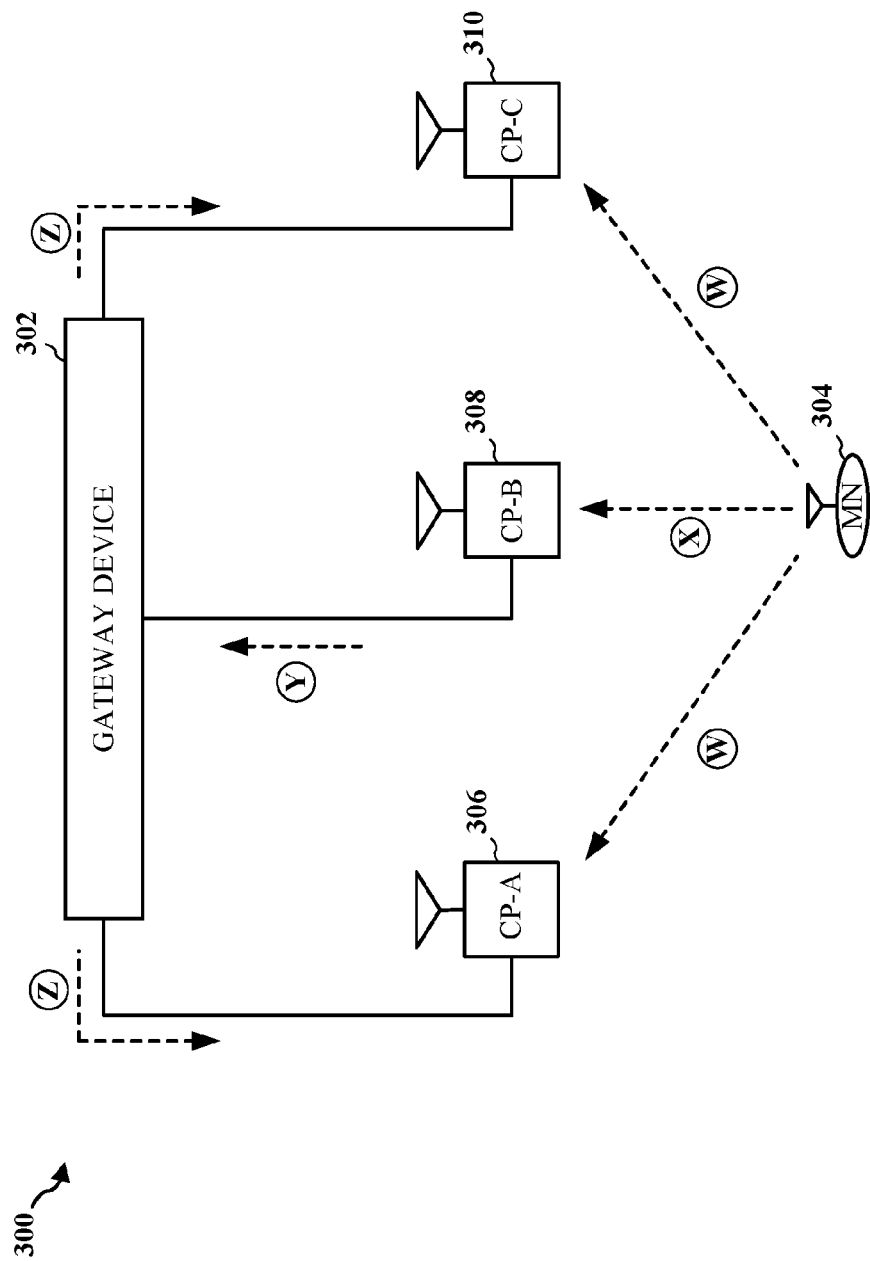
FIG. 3 is a diagram illustrating a power control signaling sequence for neighboring connection points in an exemplary communications system.

FIG. 3 is a diagram illustrating a power control signaling sequence for neighboring connection points in an exemplary communications system 300. The communications system 300 includes a gateway device 302, a mobile node (MN) 304, a first connection point (CP-A) 306, a second connection point (CP-B) 308, and a third connection point (CP-C) 310. Although not shown in FIG. 3, the communications system 300 may include other connection points connected to the gateway device 302 and capable of servicing/communicating with the MN 304.

Referring to FIG. 3, the MN 304 currently attached to (associated with), and serviced by, the CP-B 308 may discover additional connection points (e.g., CP-A 306 and CP-C 310) to which the MN 304 may associate. Accordingly, the MN 304 may notify the connection point (CP-B 308) to which the MN 304 is currently associated of the discovery. The CP-B 308 may then inform the gateway device 302 of the discovered connection points, wherein the gateway device 302 may coordinate activation of the discovered connection points in order to associate with, and service, the MN 304.

Still referring to FIG. 3, a power control signaling sequence may be as follows: At an initial state W, the MN 304 currently associated with the CP-B 3 may discover the existence of the CP-A 306 and/or the existence of the CP-C 310. At state X, the MN 304 may send discovery information to the CP-B 308 informing the CP-B 308 of the discovered connection point(s) CP-A 306 and/or CP-C 310. Thereafter, at state Y, the CP-B 208 may notify the gateway device 302 of the connection points discovered by the MN 304. The gateway device 302 may then send a power-allocation message to the CP-A 306 and/or the CP-C 310 (state Z) to increase the amount of power that each connection point can consume in order to service the MN 304.

Figure 4:
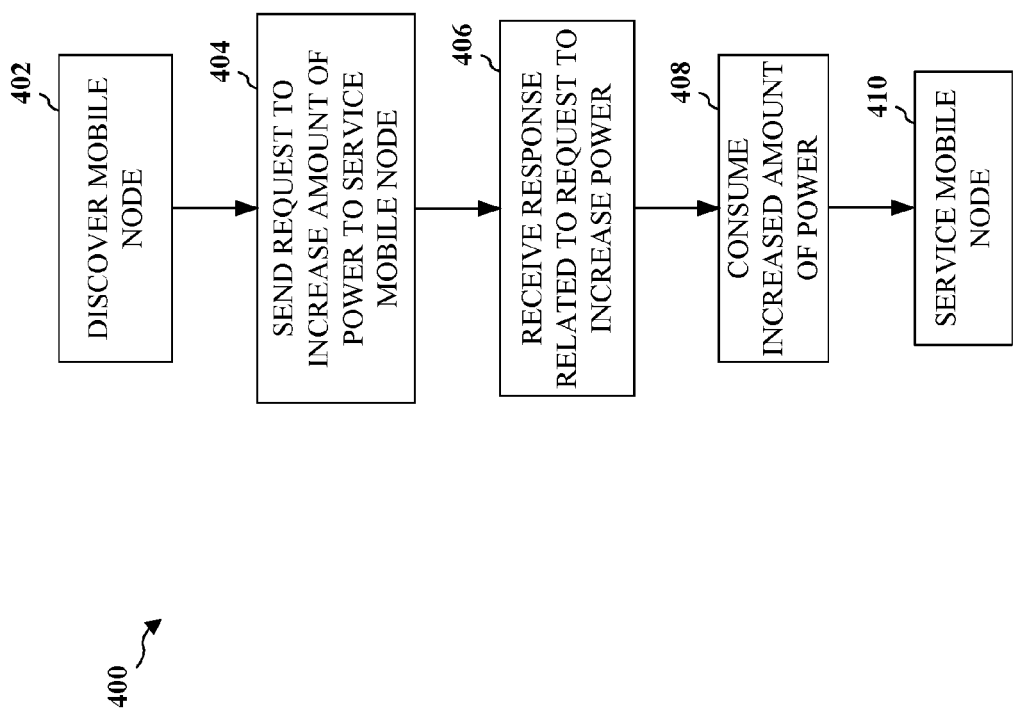
FIG. 4 is a flow chart of a method of managing power of a connection point in a wireless communication network.

FIG. 4 is a flow chart 400 of a method of managing power of a connection point in a wireless communication network. The method may be performed by a connection point (e.g., CP in FIGS. 1-3). At step 402, the connection point discovers a mobile node (e.g., WT in FIG. 1 and MN in FIGS. 2 and 3). The connection point may discover the mobile node by periodically sending an announcement indicating an existence of the connection point to the mobile node. Additionally or alternatively, the connection point may discover the mobile node by periodically monitoring for an announcement indicating an intent of the mobile node to be discovered. Moreover, the connection point may perform the discovery while the connection point is in an idle mode. In the idle mode, the connection point may periodically transmit and/or periodically monitor for discovery information.

At step 404, the connection point may send to a gateway a request to increase an amount of power that the connection point is allowed to consume to service the discovered mobile node. The request may include a request to operate the connection point in an active mode to service the discovered mobile node.

At step 406, the connection point receives from the gateway a response related to the request to increase the amount of power. For example, the received response may indicate acceptance of the power-increase request. Prior to receiving the response, the connection point may consume a first amount of power received at a power over Ethernet (PoE) port of the connection point. At step 408, the connection point may consume a second amount of power received at the PoE port after receiving the response, the second amount of power being larger that the first amount of power. Hence, the second amount of power may be an increased amount of power. The increased amount of power may be delivered by the gateway to the connection point via power over Ethernet (PoE), for example.

At step 410, the connection point services the discovered mobile node using the consumed increased amount of power. The connection point may provide service to the mobile node by establishing a communication link between the mobile node and the gateway.

Figure 5:
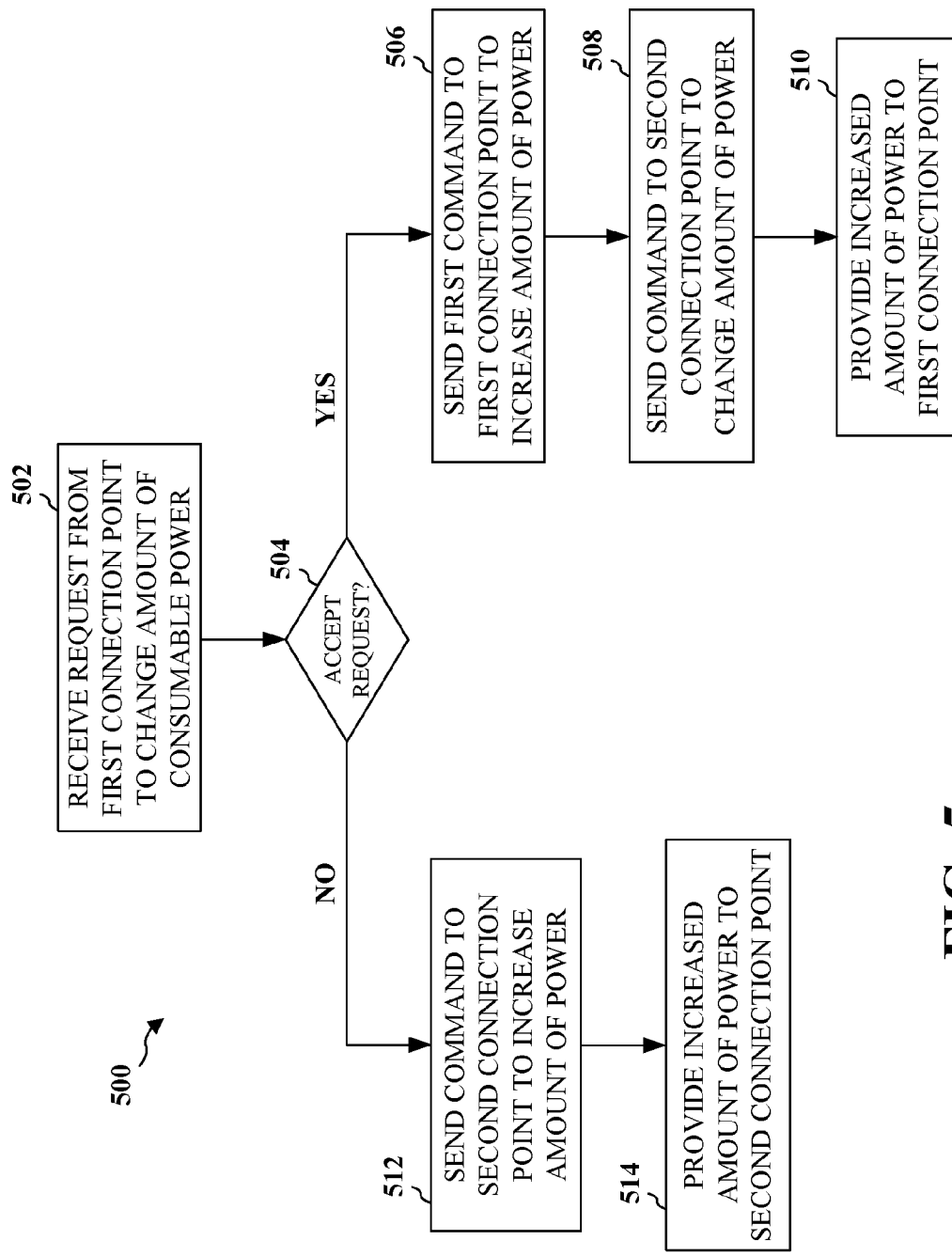
FIG. 5 is a flow chart of a method of managing power of a connection point discovering a mobile node in a wireless communication network.

FIG. 5 is a flow chart 500 of a method of managing power of a connection point discovering a mobile node in a wireless communication network. The method may be performed by a gateway (e.g., gateway device 102 in FIG. 1, gateway device 202 in FIG. 2, and gateway device 302 in FIG. 3).

At step 502, the gateway receives from a first connection point a request to change an amount of power that the first connection point is allowed to consume to service a discovered mobile node. At step 504, the gateway determines whether to accept the request from the first connection point.

The gateway may determine whether to accept the request from the first connection point based on a total power budget available and/or an amount of interference the first connection point consuming the increased amount of power will cause to a neighboring connection point. For example, the gateway may be capable of providing a particular amount of power to a number of connection points, but the particular amount of power may not be enough to allow all of the connection points to operate in the active mode. Accordingly, the gateway determines whether to accept the request from the first connection point by monitoring which connection points are in which mode so that the total power draw by the connection points is less than or equal to the amount of power that the gateway can provide. Alternatively, the gateway may be able to provide all of the power needed to allow all of the connection points to operate in the active mode simultaneously. Nonetheless, the gateway managing the modes of the connection points may still determine whether to accept the request from the first connection point to reduce power consumption.

At step 506, if the gateway accepts the request from the first connection point, the gateway sends a first command to the first connection point to increase the amount of power that the first connection point is allowed to consume to service the discovered mobile node. At step 508, the gateway may also send a command to change an amount of power that at least one second connection point (e.g., one or more connection points neighboring the first connection point) can consume to service the discovered mobile node.

In an aspect, the command sent to the at least one second connection point may include an instruction to the at least one second connection point to operate in an idle mode. Additionally or alternatively, the command sent to the at least one second connection point may include an instruction to the at least one second connection point to operate in an active mode.

In a further aspect, the command to change the amount of power that the at least one second connection point can consume may depend on whether the request from the first connection point is accepted. Accordingly, at step 508, if the gateway accepts the request from the first connection point (step 504), the gateway may send a command to the at least one second connection point to decrease the amount of power that the at least one second connection point can consume. At step 510, the gateway provides the increased amount of power to the first connection point (e.g., via power over Ethernet (PoE)) to service the discovered mobile node.

At step 512, if the gateway does not accept the request from the first connection point, the gateway may send a command to the at least one second connection point (e.g., one or more connection points neighboring the first connection point) to increase the amount of power that the at least one second connection point is allowed to consume. Thereafter, at step 514, the gateway may provide the increased amount of power to the at least one second connection point (e.g., via PoE) in order to service the discovered mobile node if the at least one second connection point is in wireless communication range with the discovered mobile node.

Figure 6:
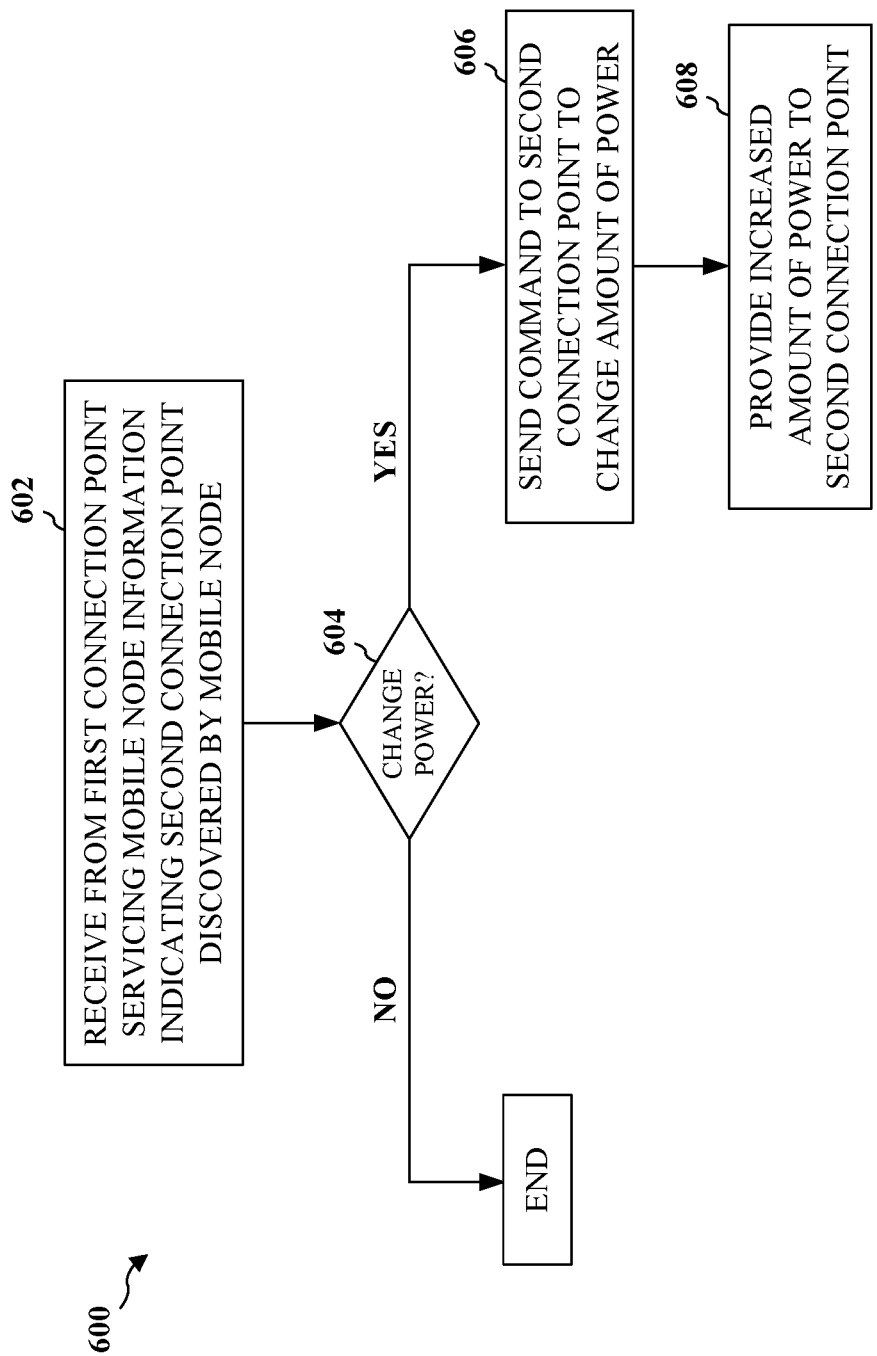
FIG. 6 is a flow chart of a method of managing power of a connection point in a wireless communication network.

FIG. 6 is a flow chart 600 of a method of managing power of a connection point in a wireless communication network. The method may be performed by a gateway (e.g., gateway device 102 in FIG. 1, gateway device 202 in FIG. 2, and gateway device 302 in FIG. 3).

At step 602, the gateway receives information from a first connection point servicing a mobile node. The information may indicate at least one second connection point (e.g., one or more connection points neighboring the first connection point) discovered by the mobile node.

At step 604, based on the received information, the gateway determines whether to change an amount of power that the discovered at least one second connection point is allowed to consume to service the mobile node. The gateway may determine whether to change the amount of power based on a total power budget available and/or an amount of interference the at least one second connection point consuming the changed amount of power will cause to a neighboring connection point.

At step 606, based on a positive result at step 604, the gateway sends a command to change the amount of power that the discovered at least one second connection point is allowed to consume. At step 608, the gateway provides the changed amount of power to the at least one second connection point (e.g., via power over Ethernet (PoE)) to service the discovered mobile node.

Figure 7:
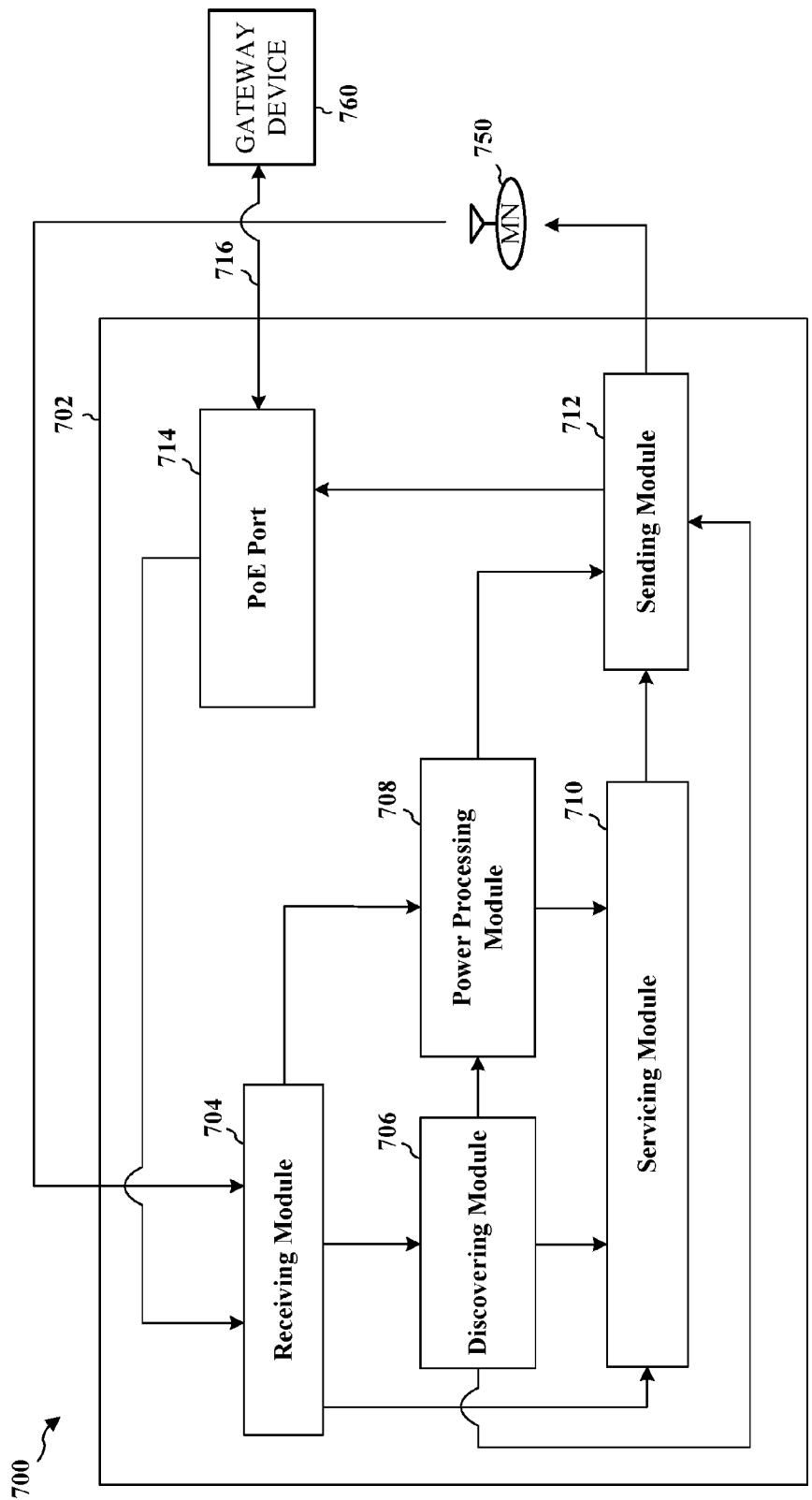
FIG. 7 is a conceptual data flow diagram illustrating the data flow between different modules/means/components in an exemplary apparatus.

FIG. 7 is a conceptual data flow diagram 700 illustrating the data flow between different modules/means/components in an exemplary apparatus 702. The apparatus 702 may be a connection point (e.g., CP in FIGS. 1-3). The apparatus includes a receiving module 704, a discovering module 706, a power processing module 708, a servicing module 710, a sending module 712, and a Power over Ethernet (PoE) port 714. The PoE port 714 may be connected to a gateway 760 via an Ethernet cable or wire 716.

The discovering module 706 may discover (via the receiving module 704) a mobile node 750 (e.g., WT in FIG. 1 and MN in FIGS. 2 and 3). The discovering module 706 may discover the mobile node 750 by periodically sending (via the sending module 712) an announcement indicating an existence of the apparatus 702 to the mobile node 750. Additionally or alternatively, the discovering module 706 may discover the mobile node 750 by periodically monitoring for (via the receiving module 704) an announcement indicating an intent of the mobile node 750 to be discovered. Moreover, the discovery module 706 may perform the discovery while the apparatus 702 is in an idle mode. In the idle mode, the apparatus 702 may periodically transmit and/or periodically monitor for discovery information.

Upon discovering the mobile node 750, the power processing module 708 may send (via the sending module 712 and the PoE port 714) to the gateway 760 a request to increase an amount of power that the apparatus 702 is allowed to consume to service the discovered mobile node 750. The request may include a request to operate in an active mode to service the discovered mobile node 750.

The power processing module 708 may receive (via the PoE port 714 and the receiving module 704) from the gateway 760 a response related to the request to increase the amount of power. For example, the received response may indicate acceptance of the power-increase request. Prior to receiving the response, the servicing module 710 may consume a first amount of power received at the PoE port 714. The servicing module 710 may consume a second amount of power received at the PoE port after receiving the response, the second amount of power being larger than the first amount of power. Hence, the second amount of power may be an increased amount of power. The increased amount of power may be delivered by the gateway 760 to the servicing module 710 via power over Ethernet (PoE) through the PoE port 714, for example.

The servicing module 710 services the discovered mobile node 750 using the consumed increased amount of power. The servicing module 710 may provide service to the mobile node 750 by establishing a communication link between the mobile node 750 and the gateway 760. For example, the established communication link may include the mobile node 750 transmitting data wirelessly and the apparatus 702 receiving the wireless transmission and relaying the received data to the gateway 760 via wired Ethernet. Similarly, the established communication link may include the apparatus 702 receiving data via wired Ethernet from the gateway 760 and relaying the received data to the mobile node 750 via wireless transmission. Thus, when the link is established between the mobile mode 750 and the gateway 760, the apparatus 702 participates in all communication between mobile node 750 and the gateway 760.

The apparatus 702 may include additional modules that perform each of the steps of the algorithm in the aforementioned flow chart of FIG. 4. As such, each step in the aforementioned flow chart of FIG. 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
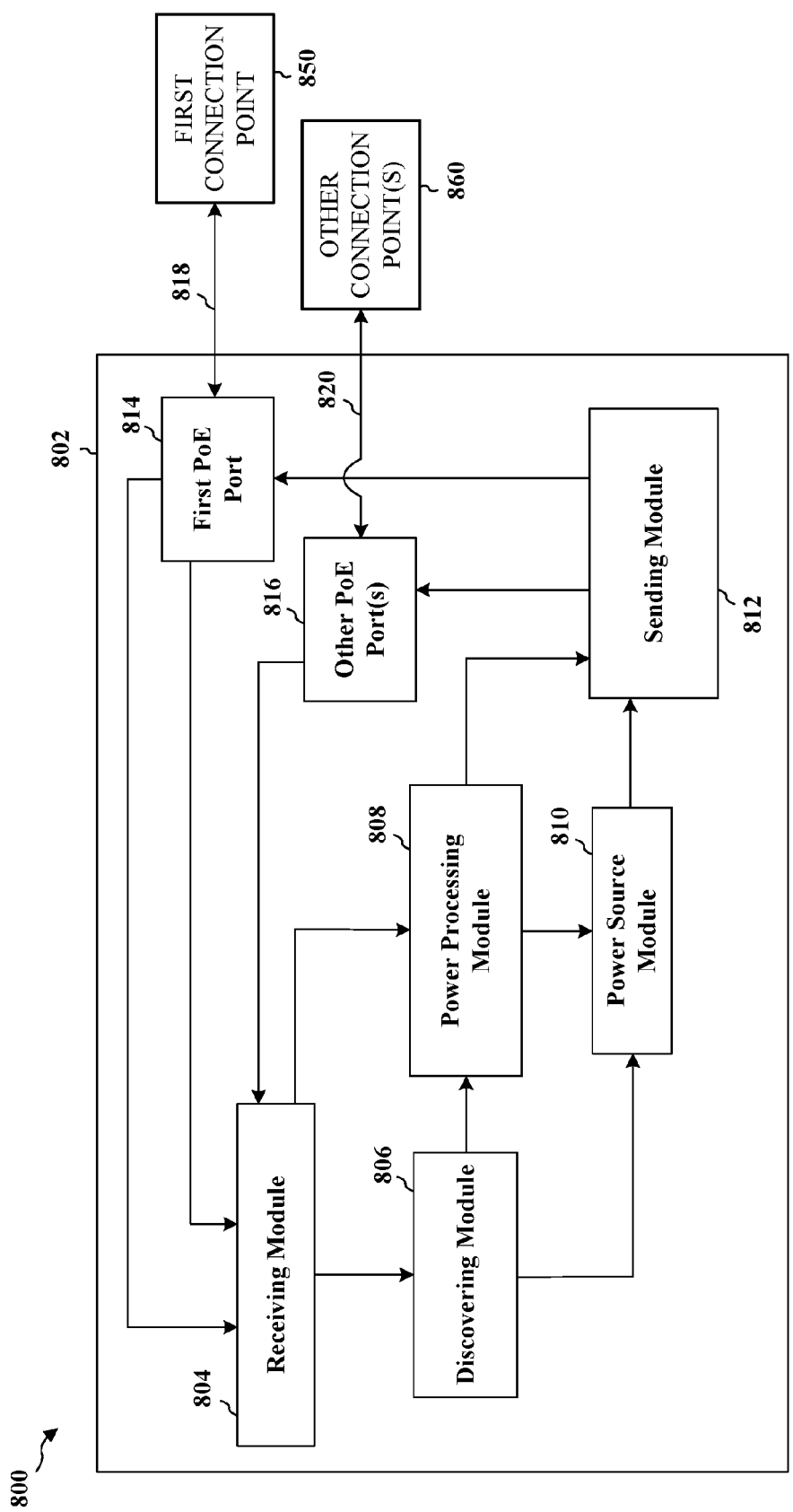
FIG. 8 is a conceptual data flow diagram illustrating the data flow between different modules/means/components in an exemplary apparatus.

FIG. 8 is a conceptual data flow diagram 800 illustrating the data flow between different modules/means/components in an exemplary apparatus 802. The apparatus may be a gateway (e.g., gateway device 102 in FIG. 1, gateway device 202 in FIG. 2, and gateway device 302 in FIG. 3). The apparatus includes a receiving module 804, a discovering module 806, a power processing module 808, a power source module 810, a sending module 812, a first Power over Ethernet (PoE) port 814, and at least one other PoE port (e.g., other PoE port(s)) 816. The first PoE port 814 may be connected to a first connection point 850 via a first Ethernet cable or wire 818. The at least one other PoE port 816 may be connected to at least one other connection point 860 (e.g., one or more connection points neighboring the first connection point 850) via at least one other Ethernet cable or wire 820.

The power processing module 808 receives (via the first PoE port 814 and the receiving module 804) from the first connection point 850 a request to change an amount of power that the first connection point 850 is allowed to consume to service a mobile node discovered by the first connection point 850. The power processing module 808 then determines whether to accept the request from the first connection point 850. The power processing module 808 may determine whether to accept the request from the first connection point 850 based on a total power budget available and/or an amount of interference the first connection point 850 consuming the increased amount of power will cause to a neighboring connection point.

If the power processing module 808 accepts the request from the first connection point 850, the power processing module 808 sends (via the sending module 812 and the first PoE port 814) a first command to the first connection point 850 to increase the amount of power that the first connection point 850 is allowed to consume to service the discovered mobile node. The power processing module 850 may also send a command to change an amount of power that the at least one other connection point 860 (e.g., one or more connection points neighboring the first connection point 850) is allowed to consume to service the discovered mobile node.

In an aspect, the command sent to the at least one other connection point 860 may include an instruction to the at least one other connection point 860 to operate in an idle mode. Additionally or alternatively, the command sent to the at least one other connection point 860 may include an instruction to the at least one other connection point 860 to operate in an active mode.

In a further aspect, the command to change the amount of power that the at least one other connection point 860 can consume may depend on whether the request from the first connection point 850 is accepted by the power processing module 808. Accordingly, if the power processing module 808 accepts the request from the first connection point 850, the power processing module 808 may send (via the sending module 812 and the at least one other PoE port 816) a command to the at least one other connection point 860 to decrease the amount of power that the at least one other connection point 860 can consume. Thereafter, the power source module 810 may provide (via the first PoE port 814) the increased amount of power to the first connection point 850 (e.g., via power over Ethernet (PoE)) to service the discovered mobile node.

If the power processing module 808 does not accept the request from the first connection point 850, the power processing module 808 may send a command to the at least one other connection point 860 (e.g., one or more connection points neighboring the first connection point 850) to increase the amount of power that the at least one other connection point 860 is allowed to consume. Thereafter, the power source module 810 may provide (via the at least one other PoE port 816) the increased amount of power to the at least one other connection point 860 (e.g., via PoE) to service the discovered mobile node.

In an aspect, the discovering module 806 may receive (via the first PoE port 814 and the receiving module 804) information from the first connection point 850 servicing a mobile node. The information may indicate at least one other connection point 860 (e.g., one or more connection points neighboring the first connection point 850) discovered by the mobile node.

Based on the information received by the discovering module 806, the power processing module 808 may determine whether to change an amount of power that the discovered at least one other connection point 860 is allowed to consume to service the mobile node. The power processing module 808 may determine whether to change the amount of power based on a total power budget available and/or an amount of interference the at least one other connection point 860 consuming the changed amount of power will cause to a neighboring connection point.

If the power processing module 808 determines to change the amount of power, the power processing module 808 may send a command to the at least one other connection point 860 to change the amount of power that the at least one other connection point 860 is allowed to consume. Thereafter, the power source module 810 may provide the changed amount of power to the at least one other connection point 860 (e.g., via power over Ethernet (PoE)) in order to service the discovered mobile node.

The apparatus may include additional modules that perform each of the steps of the algorithm in the aforementioned flow charts of FIGS. 5-6. As such, each step in the aforementioned flow charts of FIGS. 5-6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
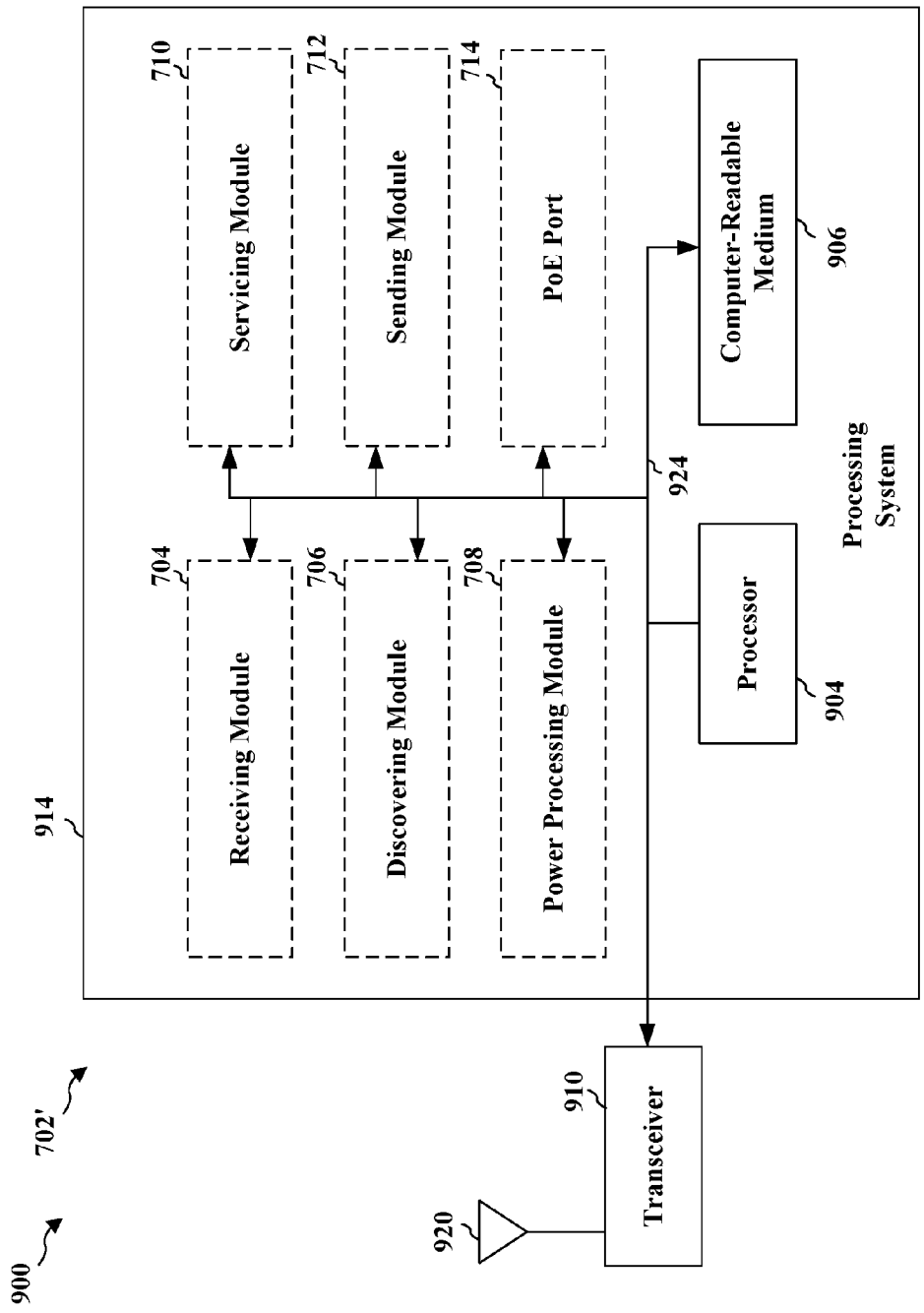
FIG. 9 is a diagram illustrating an example of a hardware implementation for an apparatus employing a processing system.

FIG. 9 is a diagram 900 illustrating an example of a hardware implementation for an apparatus 702' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 704, 706, 708, 710, 712, the PoE port 714, and the computer-readable medium 906. The bus 924 may also link various other circuits such as timing sources, peripherals, voltage regulators, and power management circuits, which are well known in the art, and therefore, will not be described any further. The Ethernet cable or wire 716 may be connected between the PoE port 714 and the gateway device 760.

The processing system 914 may be coupled to a transceiver 910. The transceiver 910 may be coupled to one or more antennas 920. The transceiver 910 may also be coupled to cable or wiring (e.g., the Ethernet cable or wire 716) to facilitate wired transmissions with the PoE port 714. The transceiver 910 provides a means for communicating with various other apparatus over a wireless or wired transmission medium. The transceiver 910 receives a signal from the one or more antennas 920, cable, or wire, extracts information from the received signal, and provides the extracted information to the processing system 914, specifically the receiving module 704 and/or the PoE port 714. In addition, the transceiver 910 receives information from the processing system 914, specifically the sending module 712 and/or the PoE port 714, and based on the received information, generates a signal to be applied to the one or more antennas 920, cable, or wire. The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software. The processing system further includes at least one of the modules 704, 706, 708, 710, 712, and PoE port 714. The modules/port may be software modules running in the processor 904, resident/stored in the computer readable medium 906, one or more hardware modules coupled to the processor 904, or some combination thereof.

In one configuration, the apparatus 702/702' for wireless communication includes means for discovering a mobile node, means for sending to a gateway a request to increase an amount of power that the connection point can consume in order to service the discovered mobile node, and means for receiving from the gateway a response related to the request to increase the amount of power, means for servicing the discovered mobile node when the received response indicates acceptance of the request to increase the amount of power that the connection point can consume, and means for consuming an increased amount of power, the increased amount of power delivered by the gateway to the connection point via power over Ethernet (PoE). The aforementioned means may be one or more of the aforementioned modules of the apparatus 702 and/or the processing system 914 of the apparatus 702' configured to perform the functions recited by the aforementioned means.

Figure 10:
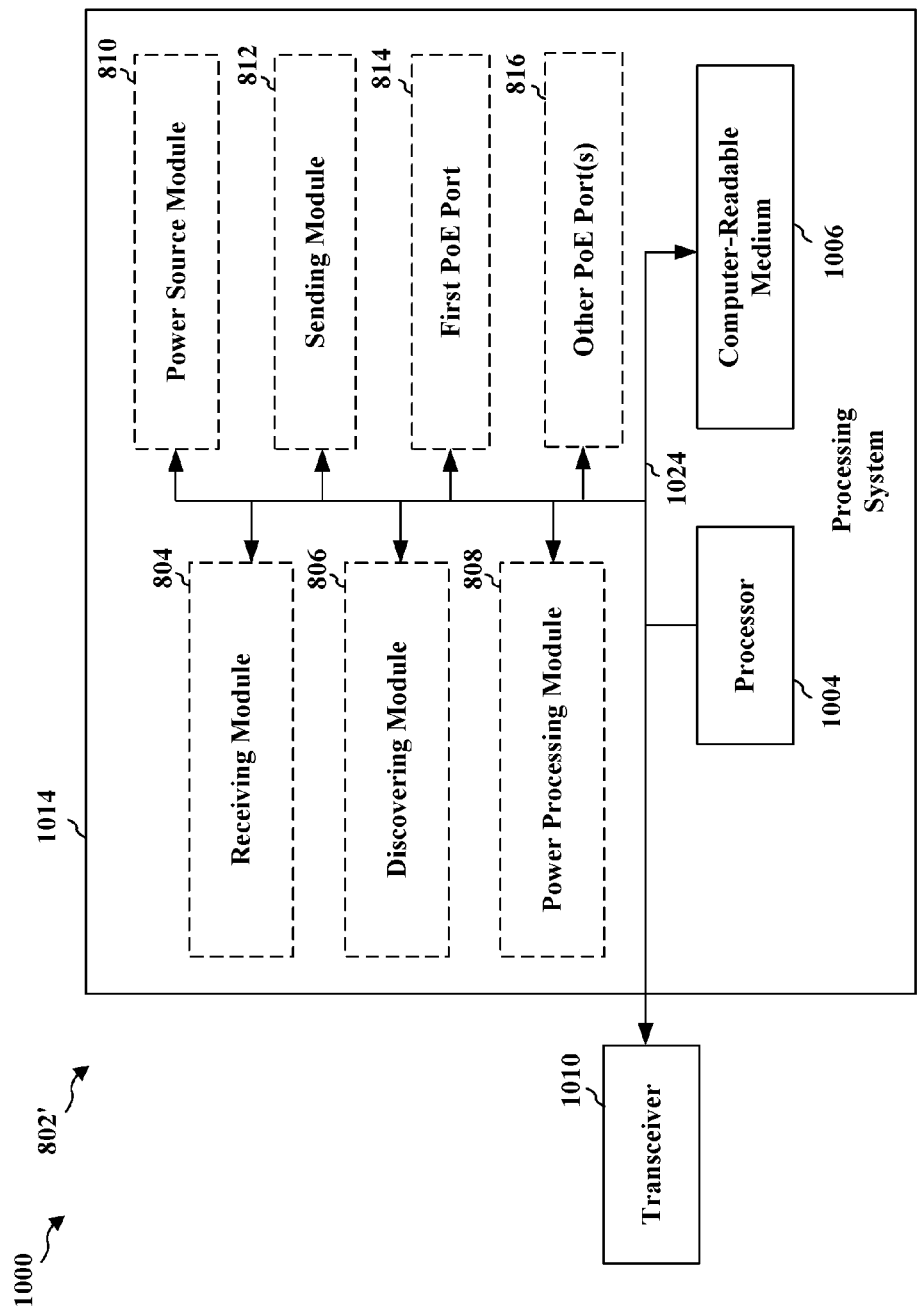
FIG. 10 is a diagram illustrating an example of a hardware implementation for an apparatus employing a processing system.

FIG. 10 is a diagram 1000 illustrating an example of a hardware implementation for an apparatus 802' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 804, 806, 808, 810, 812, the first PoE port 814, the at least one other PoE port 816, and the computer-readable medium 1006. The bus 1024 may also link various other circuits such as timing sources, peripherals, voltage regulators, and power management circuits, which are well known in the art, and therefore, will not be described any further. The first Ethernet cable or wire 818 may be connected between the first PoE port 814 and the first connection point 850. The at least one other Ethernet cable or wire 820 may be connected between the at least one other PoE port 816 and the at least one other connection point 860.

The processing system 1014 may be coupled to a transceiver 1010. The transceiver 1010 may be coupled to cable or wiring (e.g., the first Ethernet cable or wire 818 or the at least one other Ethernet cable or wire 820). The transceiver 1010 provides a means for communicating with various other apparatus over a wired transmission medium. The transceiver 1010 receives a signal from the cable or wire, extracts information from the received signal, and provides the extracted information to the processing system 1014, specifically the receiving module 804, the first PoE port 814, and/or the at least one other PoE port 816. In addition, the transceiver 1010 receives information from the processing system 1014, specifically the sending module 812, the first PoE port 814, and/or the at least one other PoE port 816, and based on the received information, generates a signal to be applied to the cable or wire. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 804, 806, 808, 810, 812, the first PoE port 814, and the at least one other PoE port 816. The modules/ports may be software modules running in the processor 1004, resident/stored in the computer readable medium 1006, one or more hardware modules coupled to the processor 1004, or some combination thereof.

In one configuration, the apparatus 802/802' for wireless communication includes means for means for receiving from a first connection point a request to change an amount of power that the first connection point can consume in order to service a discovered mobile node, means for determining whether to accept the request from the first connection point to change the amount of power, means for sending a first command to increase the amount of power that the first connection point can consume to service the discovered mobile node if the request from the first connection point is accepted, means for sending a second command to change an amount of power that at least one second connection point can consume to service the discovered mobile node, the change dependent on whether the request from the first connection point is accepted, means for providing the increased amount of power to the first connection point via power over Ethernet (PoE) if the request from the first connection point is accepted, means for providing the increased amount of power to the at least one second connection point via PoE if the request from the first connection point is not accepted, means for receiving from a first connection point servicing a mobile node, information indicating at least one second connection point discovered by the mobile node, means for determining to change an amount of power that the discovered at least one second connection point can consume in order to service the mobile node, and means for sending a command to change the amount of power that the discovered at least one second connection point can consume. The aforementioned means may be one or more of the aforementioned modules of the apparatus 802 and/or the processing system 1014 of the apparatus 802' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of managing power of a connection point in a wireless communication network, comprising:
   receiving, from a first connection point, information related to the first connection point, the information including a request to change an amount of power that the first connection point is allowed to consume to service a discovered mobile node;
   determining, based on the information, whether to accept the request to change an allowable amount of power to consume for servicing the discovered mobile node; and
   sending, when the request from the first connection point is accepted, a command to the connection point based on the determination, the command indicating an increase of the amount of power that the first connection point is allowed to consume to service the discovered mobile node.

2. The method of claim 1, further comprising sending a second command to change an amount of power that at least one second connection point is allowed consume based on whether the request from the first connection point is accepted.

3. The method of claim 2,
   wherein the second command decreases the amount of power that the at least one second connection point is allowed to consume if the request from the first connection point is accepted, and
   wherein the second command increases the amount of power that the at least one second connection point is allowed to consume if the request from the first connection point is not accepted.

4. The method of claim 3, further comprising:
   providing the increased amount of power to the first connection point via power over Ethernet (PoE) if the request from the first connection point is accepted; and
   providing the increased amount of power to the at least one second connection point via PoE if the request from the first connection point is not accepted.

5. The method of claim 2, wherein the second command comprises an instruction to the at least one second connection point to operate in an idle mode.

6. The method of claim 2, wherein the second command comprises an instruction to the at least one second connection point to operate in an active mode.

7. The method of claim 1, wherein the determining whether to accept the request from the first connection point to change the amount of power is based on at least one of:
   a total power budget available; or
   an amount of interference the first connection point consuming the increased amount of power will cause to a neighboring connection point.

8. The method of claim 1, further comprising:
   receiving from the first connection point servicing the mobile node, information indicating at least one second connection point discovered by the mobile node,
   determining to change an amount of power that the discovered at least one second connection point is allowed to consume to service the mobile node, and
   sending a command to change the amount of power that the discovered at least one second connection point is allowed to consume.

9. The method of claim 8, wherein the determining to change the amount of power is based on at least one of:
   a total power budget available; or
   an amount of interference the at least one second connection point consuming the changed amount of power will cause to a neighboring connection point.

10. An apparatus for managing power of a connection point in a wireless communication network, comprising:
    means for receiving, from a first connection point, information related to the first connection point, the information including a request to change an amount of power that the first connection point is allowed to consume to service a discovered mobile node;

means for determining, based on the information, whether to accept the request to change an allowable amount of power to consume for servicing the discovered mobile node; and means for sending, when the request from the first connection point is accepted, a command to the connection point based on the determination, the command indicating an increase of the amount of power that the first connection point is allowed to consume to service the discovered mobile node.

11. The apparatus of claim 10, further comprising means for sending a second command to change an amount of power that at least one second connection point is allowed to consume based on whether the request from the first connection point is accepted.

12. The apparatus of claim 11,
wherein the second command decreases the amount of power that the at least one second connection point is allowed to consume if the request from the first connection point is accepted, and
wherein the second command increases the amount of power that the at least one second connection point is allowed to consume if the request from the first connection point is not accepted.

13. The apparatus of claim 12, further comprising:
means for providing the increased amount of power to the first connection point via power over Ethernet (PoE) if the request from the first connection point is accepted; and
means for providing the increased amount of power to the at least one second connection point via PoE if the request from the first connection point is not accepted.

14. The apparatus of claim 11, wherein the second command comprises an instruction to the at least one second connection point to operate in an idle mode.

15. The apparatus of claim 11, wherein the second command comprises an instruction to the at least one second connection point to operate in an active mode.

16. The apparatus of claim 10, wherein the means for determining is configured to determine whether to accept the request from the first connection point to change the amount of power based on at least one of:
a total power budget available; or
an amount of interference the first connection point consuming the increased amount of power will cause to a neighboring connection point.

17. The apparatus of claim 10, wherein:
the means for receiving is configured to receive from the first connection point servicing the mobile node, information indicating at least one second connection point discovered by the mobile node,
the means for determining is configured to determine to change an amount of power that the discovered at least one second connection point is allowed to consume to service the mobile node, and
the means for sending is configured to send a command to change the amount of power that the discovered at least one second connection point is allowed to consume.

18. The apparatus of claim 17, wherein the means for determining is configured to determine to change the amount of power based on at least one of:
a total power budget available; or
an amount of interference the at least one second connection point consuming the changed amount of power will cause to a neighboring connection point.

19. An apparatus for managing power of a connection point in a wireless communication network, comprising:

a memory; and
at least one processor coupled to the memory and configured to:
receive, from a first connection point, information related to the first connection point, the information including a request to change an amount of power that the first connection point is allowed to consume to service a discovered mobile node;
determine, based on the information, whether to change an allowable amount of power to consume for servicing the discovered mobile node; and
send, when the request from the first connection point is accepted, a command to the connection point based on the determination, the command indicating an increase of the amount of power that the first connection point is allowed to consume to service the discovered mobile node.

20. The apparatus of claim 19, the at least one processor further configured to send a second command to change an amount of power that at least one second connection point is allowed to consume based on whether the request from the first connection point is accepted.

21. The apparatus of claim 20,
wherein the second command decreases the amount of power that the at least one second connection point is allowed to consume if the request from the first connection point is accepted, and
wherein the second command increases the amount of power that the at least one second connection point is allowed to consume if the request from the first connection point is not accepted.

22. The apparatus of claim 21, the at least one processor further configured to:
provide the increased amount of power to the first connection point via power over Ethernet (PoE) if the request from the first connection point is accepted; and
provide the increased amount of power to the at least one second connection point via PoE if the request from the first connection point is not accepted.

23. The apparatus of claim 20, wherein the second command comprises an instruction to the at least one second connection point to operate in an idle mode.

24. The apparatus of claim 20, wherein the second command comprises an instruction to the at least one second connection point to operate in an active mode.

25. The apparatus of claim 19, wherein the at least one processor configured to determine is configured to determine whether to accept the request from the first connection point to change the amount of power based on at least one of:
a total power budget available; or
an amount of interference the first connection point consuming the increased amount of power will cause to a neighboring connection point.

26. The apparatus of claim 19, the at least one processor further configured to:
receive from the first connection point servicing the mobile node, information indicating at least one second connection point discovered by the mobile node;
determine to change an amount of power that the discovered at least one second connection point is allowed to consume to service the mobile node; and
send a command to change the amount of power that the discovered at least one second connection point is allowed to consume.

27. The apparatus of claim 26, wherein the at least one processor configured to determine is configured to determine to change the amount of power based on at least one of:

a total power budget available; or an amount of interference the at least one second connection point consuming the changed amount of power will cause to a neighboring connection point.

28. A non-transitory computer-readable medium storing computer-executable code for managing power of a connection point in a wireless communication network, comprising code to:

receive, from a first connection point, information related to the first connection point, the information including a request to change an amount of power that the first connection point is allowed to consume to service a discovered mobile node;

determine, based on the information, whether to change an allowable amount of power to consume for servicing a mobile node; and send, when the request from the first connection point is accepted, a command to the connection point based on the determination, the command indicating an increase of the amount of power that the first connection point is allowed to consume to service the discovered mobile node.

29. The computer-readable medium of claim 28, the computer-readable medium further comprising code to send a second command to change an amount of power that at least one second connection point is allowed to consume based on whether the request from the first connection point is accepted.

30. The computer-readable medium of claim 29,
wherein the second command decreases the amount of power that the at least one second connection point is allowed to consume if the request from the first connection point is accepted, and
wherein the second command increases the amount of power that the at least one second connection point is allowed to consume if the request from the first connection point is not accepted.

31. The computer-readable medium of claim 29, further comprising code to:

provide the increased amount of power to the first connection point via power over Ethernet (PoE) if the request from the first connection point is accepted; and provide the increased amount of power to the at least one second connection point via PoE if the request from the first connection point is not accepted.

32. The computer-readable medium of claim 29, wherein the second command comprises an instruction to the at least one second connection point to operate in an idle mode.

33. The computer-readable medium of claim 29, wherein the second command comprises an instruction to the at least one second connection point to change to an active mode.

34. The computer-readable medium of claim 28, wherein the code to determine includes code to determine whether to accept the request from the first connection point to change the amount of power based on at least one of:

a total power budget available; or an amount of interference the first connection point consuming the increased amount of power will cause to a neighboring connection point.

35. The computer-readable medium of claim 28, further comprising code to:

receive from the first connection point servicing the mobile node, information indicating at least one second connection point discovered by the mobile node, determine to change an amount of power that the discovered at least one second connection point is allowed to consume to service the mobile node, and send a command to change the amount of power that the discovered at least one second connection point is allowed to consume.

36. The computer-readable medium of claim 35, wherein the code to determine includes code to determine to change the amount of power based on at least one of:

a total power budget available; or an amount of interference the at least one second connection point consuming the changed amount of power will cause to a neighboring connection point.

* * * * *